United States Patent [19]

Judas

[11] Patent Number: 5,162,484
[45] Date of Patent: Nov. 10, 1992

[54] THERMOTROPIC SEMIALIPHATIC COPOLYESTERAMIDES

[75] Inventor: Didier Judas, Paris, France

[73] Assignee: Atochem, Puteaux, France

[21] Appl. No.: 551,401

[22] Filed: Jul. 12, 1990

[30] Foreign Application Priority Data

Jul. 12, 1989 [FR] France .................. 89 09383

[51] Int. Cl.$^5$ ................ C08G 63/02; C08G 63/00
[52] U.S. Cl. ............................ 528/183; 528/176; 528/184; 528/194
[58] Field of Search ............... 528/176, 183, 184, 194

[56] References Cited

U.S. PATENT DOCUMENTS

| | | | |
|---|---|---|---|
| 3,306,875 | 2/1967 | Hay | 528/176 |
| 3,598,864 | 8/1971 | Caldwell et al. | 528/183 |
| 4,137,219 | 1/1979 | Idel et al. | 528/177 |
| 4,182,842 | 1/1980 | Jackson et al. | 528/292 |
| 4,764,582 | 8/1988 | Hisgen et al. | 528/184 |
| 4,864,009 | 9/1989 | Finke et al. | 528/172 |
| 4,900,802 | 2/1990 | Quentin | 528/190 |
| 4,904,756 | 2/1990 | Quentin | 528/193 |
| 4,925,911 | 5/1990 | Quentin | 528/184 |

FOREIGN PATENT DOCUMENTS 0272992 12/1987 European Pat. Off. .

OTHER PUBLICATIONS

European Search Report No. EP 90 40 1997.

Primary Examiner—John Kight, III
Assistant Examiner—T. Mosley
Attorney, Agent, or Firm—Burns, Doane, Swecker & Mathis

[57] ABSTRACT

Novel thermotropic semialiphatic copolyesteramides having relatively low melt temperatures contain the following recurring structural units:

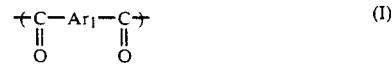

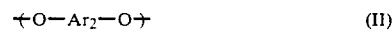

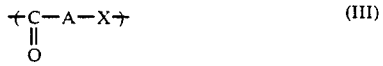

in which $Ar_1$ is a divalent aromatic and/or cycloaliphatic radical, $Ar_2$ is a divalent aromatic radical, X is —NH— or —CO—, and A includes a divalent aliphatic hydrocarbyl radical.

13 Claims, No Drawings

THERMOTROPIC SEMIALIPHATIC COPOLYESTERAMIDES

BACKGROUND OF THE INVENTION

1. Field of the Invention

The present invention relates to novel thermotropic semialiphatic copolyesteramides comprising recurring structural units emanating from an aromatic dicarboxylic acid or derivative thereof, from a diphenol or derivative thereof, and from an aliphatic amino acid and/or a lactam and/or a diacidic polyamide or derivatives thereof, as well as to a process for the preparation of such novel thermotropic copolyesteramides.

The amide copolyesters of the present invention are thermotropic, namely, they can be converted into anisotropic melts which are easy to shape by spinning or molding.

2. Description of the Prior Art

As indicated in EP-A-0,010,051, a demonstration of the anisotropy of polyesters can be carried out using the TOT thermooptical method described in FR-A-2,270,282. When the copolymer is observed in the molten state in optical systems equipped with crossed polarizers, transmission of polarized light and creation of a strong birefringence are produced, whereas the light transmission and the birefringence are nil in the case of isotropic materials. As a result of these phenomena, anisotropic melts have a specific orientation and a relatively high degree of organization which are transferred to articles shaped therefrom, such as filaments, films and molded objects, providing them, even in the raw state, with such improved properties as modulus and tenacity which typically are not encountered in isotropic raw materials. In particular, these molded shaped articles have advantageous characteristics and properties in one direction, which are comparable to those of plastics reinforced with glass fibers.

The thermotropic copolyesteramides described in EP-A-0,010,051, and also in EP-A-0,007,715, U.S. Pat. Nos. 4,330,457, 4,355,132 and 4,182,842, and FR-A-2,607,818 essentially consist of wholly aromatic and/or cyclic recurring structural units.

In general, while the thermotropic copolymers exhibit excellent mechanical properties, they have, on the other hand, high melting temperatures: on the order of 200° to 400° C. and more typically from 270° to 370° C. These high temperatures require specialized conversion apparatus and present energy requirements which are higher than those needed to convert conventional resins. Furthermore, when the melt temperatures are high, molded shaped articles that have excellent mechanical properties are difficult, if not impossible, to produce.

SUMMARY OF THE INVENTION

Accordingly, a major object of the present invention is the provision of novel thermotropic copolyesters comprising aliphatic recurring units emanating from amino acids and/or lactams and/or diacid polyamides, which novel thermotropic copolyesters, depending on the proportion of aliphatic recurring units contained therein, have melt temperatures typically on the order of 10° to 50° C. lower than those of the wholly aromatic or cyclic copolyesters having a structure which, with the above exception, is overall substantially similar. The properties of these respective copolyesters are also substantially similar.

Briefly, the copolyesteramides of the present invention comprise the following recurring structural units:

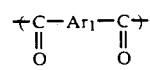  (I)

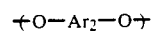  (II)

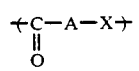  (III)

in which $Ar_1$ is an aromatic and/or cycloaliphatic divalent radical, $Ar_2$ is an aromatic divalent radical and X is —NH— or

with the proviso that, if X is —NH—, A is a linear or branched chain $C_nH_{2n}$ divalent aliphatic hydrocarbyl radical and D is a number ranging from 4 to 14, and, if X is

the recurring unit

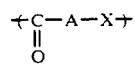

comprises an alpha, omega-diacidic polyamide oligomer of the formula:

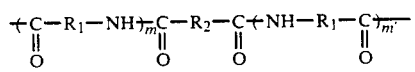

in which $R_1$ is a linear or branched chain $C_{n'}H_{2n'}$ divalent aliphatic hydrocarbyl radical and n' is a number ranging from 4 to 14; or a radical of the formula:

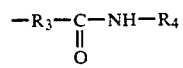

wherein $R_3$ and $R_4$, which may be identical or different, are each a linear or branched chain $C_{n''}H_{2n''}$ divalent aliphatic hydrocarbyl radical and n'' ranges from 2 to 24; $R_2$ is a divalent aliphatic, cycloaliphatic or aromatic diacid radical, preferably having less than 24 carbon atoms; and m and m', which may be identical or different, are numbers ranging from 0 to 50, at least one such number being at least equal to 1.

DETAILED DESCRIPTION OF THE PREFERRED EMBODIMENTS OF THE INVENTION

More particularly according to the present invention, in the recurring units (I) and (II) each of the divalent radicals $Ar_1$ and $Ar_2$ is a radical containing one or more aromatic nuclei which may be joined or bonded together either via a covalent bond, or via a bridging oxygen or sulfur atom, or via an unsaturated or saturated, linear or branched aliphatic divalent bridging radical optionally comprising one or more oxygen and/or sulfur atoms within such chain.

The divalent radical Ar₁ may also be cycloaliphatic radicals.

The above nuclei may also be branched, for example with monovalent radicals of alkyl type, or substituted by chlorine or bromine atoms or monovalent aromatic radicals which themselves may comprise branched substituents.

The recurring unit (I) is advantageously a structural unit emanating from at least one aromatic or cycloaliphatic dicarboxylic acid or derivative thereof.

With regard to the recurring unit (II), this is advantageously a structural unit emanating from at least one diphenol or derivative thereof.

The recurring unit (III) may be derived from an aliphatic amino acid and/or from a lactam, such that it corresponds to the formula:

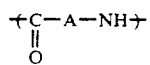

wherein A is the divalent aliphatic radical described above.

This recurring unit (III) may also comprise the reaction product of an aliphatic amino acid and/or of a lactam with a diacid.

In the event that the diacid is aliphatic, the recurring unit (III) is wholly aliphatic. In the event that the diacid is cycloaliphatic or aromatic, the recurring unit (III) in fact includes two units (III'), corresponding to (III), which are bonded to a unit (I) according to the following scheme:

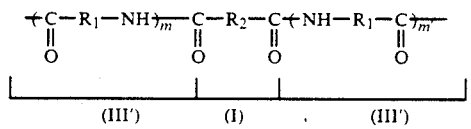

in which R₁ is the divalent aliphatic radical described above and R₂ is the divalent diacid radical, also described above.

This recurring unit (III) can also originate by reaction of an aliphatic diamine with a diacid. In the event that this diacid is aliphatic, the unit (III) is wholly aliphatic. In the event that the diacid is cycloaliphatic or aromatic, the unit (III) includes two units (III'), corresponding to (III), which are bonded to a unit (I) according to the following scheme:

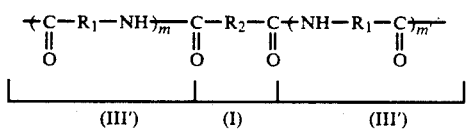

wherein R₁ is the divalent radical

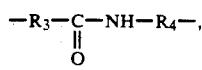

in which R₃ and R₄ are the divalent radicals described above and R₂ is the divalent organic diacid radical also described above.

Furthermore, in the semialiphatic coplyesteramides according to the invention where the functional groups

and —NH— originating from the amine or from the lactam are necessarily connected via a bridging aliphatic radical, it is recommended, in order to obtain the best properties of the thermotropic polymers, to balance the respective amounts of the three units (I), (II) and (III) in a suitable manner. Accordingly, the weight ratio of (III) to (I)+(II)+(III) should preferably range from 1 to 50% and, more preferably, from 1 to 30%. Also, in the event that X=NH, the molar ratio of the units (II)/(I) should preferably range from 0.95 to 1.05. In this case, the respective molecular weights of each of the three units (I), (II) and (III) preferably range from 100 to 500 such as to provide a copolyesteramide having a molecular weight which preferably ranges from 3,000 to 50,000.

Further, in the event that X=CO, the molar ratio of the units (I)+(III)/(II) should preferably range from 0.95 to 1.05. In this case, the respective molecular weights of the two units (I) and (II) preferably range from 100 to 500, and the molecular weights of the dicarboxylic polyamides represented by the unit (III) preferably range from 300 to 15,000 and more preferably from 600 to 5,000 such as to provide a copolyesteramide having a molecular weight which preferably ranges from 3,000 to 50,000.

The recurring units (I) are typically derived from aromatic and/or cycloaliphatic dicarboxylic acids or derivatives thereof, such as their diesters. They may be used either by themselves or as mixtures. The preferred aromatic diacids include terephthalic acid, isophthalic acid, 4,4'-dicarboxydiphenyl ether, 4,4'-dicarboxydiphenyl sulfide, 4,4'-dicarboxybiphenyl, 4,4''-dicarboxy-para-terphenyl, 2,6-dicarboxynaphthalene, 2,7-dicarboxynaphthalene, 1,5-carboxynaphthalene, 4,4'-dicarboxy-1,2-diphenoxyethane, 4,4'-dicarboxy-1,4-diphenoxybutane, 4,4'-dicarboxy-1,6-diphenoxyhexane and 4,4'-dicarboxy-trans-stilbene.

The preferred cycloaliphatic diacids include 1,4-dicarboxycyclohexane in the cis and/or trans form.

The recurring units (II) are typically derived from a diphenol or derivative thereof, such as diesters. They may be used either by themselves or as mixtures. The preferred diphenols include hydroquinone, chlorohydroquinone, bromohydroquinone, methylhydroquinone, ethylhydroquinone, phenylhydroquinone, resorcinol, 4,4'-dihydroxybiphenyl, 4,4'-dihydroxydiphenyl ether, 4,4'-dihydroxydiphenyl sulfide, 4,4'-dihydroxy-trans-stilbene, 2,6-dihydroxynaphthalene, 1,5-dihydroxynaphthalene and 2,7-dihydroxynaphthalene.

The recurring units (III) are typically derived from a diacidic polyamide oligomer and/or from an amino acid and/or from a lactam. The dicarboxylic polyamide oligomers constituting the recurring unit (III) are per se known to this art. They are prepared according to conventional methods for the production of such polyamides, for example by polycondensation of a lactam and/or of an amino acid, or of a diacid with a diamine. These polycondensations are carried out in the optional presence of an organic diacid. During the polycondensation, these organic diacids become integrated in the macromolecular chain of the polyamides and act as chain limiters; this makes it possible to prepare alpha, omega-dicarboxylic polyamide oligomers. Depending on the magnitude of the excess of organic diacid in the polycondensation, the length of the macromolecular chain, and consequently the average molecular weight of the polyamide, can be controlled.

The alpha, omega-dicarboxylic polyamide oligomers have average molecular weights which can vary over a wide range. These average molecular weights preferably range from 3,000 to 15,000 and, more preferably, from 600 to 5,000.

The carboxylic diacids employed in the synthesis of the diacidic polyamide oligomers of the recurring unit (III) to provide a carboxylic acid group at each end of the polyamide chain, thus serving as a chain limiter, include, in particular: alkanedioic diacids such as, for example, succinic, adipic, suberic, azelaic, sebacic, undecanedioic or dodecanedioic acids, or cycloaliphatic or aromatic diacids, such as terephthalic, isophthalic or cyclohexanedicarboxylic acids.

The aliphatic lactams and amino acids which are employed have a hydrocarbon chain in which the number of carbon atoms preferably ranges from 4 to 14. Exemplary thereof are butyrolactam, caprolactam, oenantholactam, decalactam, undecanolactam, dodecanolactam, 6-aminohexanoic acid, 10-aminodecanoic acid, 11-aminoundecanoic acid and 12-aminododecanoic acid.

Exemplary polyamide oligomers prepared by polycondensation of a diacid with an aliphatic diamine include nylons 66, 69 and 610, which are obtained from hexamethylenediamine and adipic, azelaic, sebacic and 1,12-dodecanedioic acid, or nylon 96, obtained from nonamethylenediamine and adipic acid.

Exemplary polyamide oligomers prepared by polycondensation of a cycloaliphatic or aromatic diacid with an aliphatic diamine are the polymers obtained from hexamethylenediamine or from 1,12-dodecanediamine.

When the recurring unit (III) is derived from an aliphatic lactam or amino acid, these latter compounds may correspond to those referred to above.

The thermotropic semialiphatic copolyesteramides according to the invention can be prepared by any process, such as, for example, by polycondensation of a mixture of the compounds in the form of aromatic or cycloaliphatic diacids, or of one of the derivatives thereof, and of amino acid and/or of lactam. The amino acid and the lactam can be replaced by a dicarboxylic polyamide oligomer, optionally prepared beforehand.

The various components may be introduced into the reaction mixture in any order, separately or together. While they can be introduced as a mixture, they may also be successively introduced, partially or wholly, during the reaction.

The condensation reaction typically is carried out under an inert atmosphere at a temperature ranging from 100° to 450° C. and preferably from 150° to 400° C., with stirring, up to a degree of condensation which is typically on the order of 80%. In particular, this condensation temperature ranges from 150° C. to 400° C. when acetic anhydride is employed and, in particular, ranges from 250° to 400° C. when diphenol diesters are employed directly.

The unreacted reactants and the by-products formed, such as acid or a phenol or water can be removed under a vacuum which can be as high as 5 Pa.

The copolyesteramides according to the invention can be prepared by direct polyesterification and polyamidification between at least one aromatic or cycloaliphatic diacid HOOC—Ar$_1$—COOH, at least one diphenol HO—Ar$_2$—OH and at least one amino acid

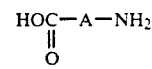

and/or at least one lactam

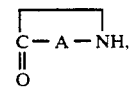

and/or at least one diacidic polyamide

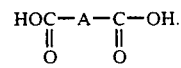

This reaction can be represented schematically as follows: —COOH+H—X⟶—COX—+H$_2$O (with X=O and NH). In this case, the polyesteramides obtained will have COOH endgroups emanating from the monomers and/or oligomers, where appropriate, containing carboxylic acid functional groups, and/or OH and NH$_2$ endgroups emanating from the monomers containing a hydroxyl and amino functional group, it being understood that the lactam may also, after ring opening, result in polymers in which the endgroups may be COOH and/or NH$_2$.

They can also be prepared by a polyesterification or polyamidification reaction between at least one aromatic or cycloaliphatic diacid HOOC—Ar$_1$—COOH, at least one diphenol HO—Ar$_2$—OH and at least one amino acid

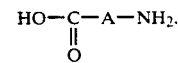

and/or at least one lactam

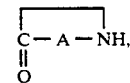

and/or at least one diacidic polyamide

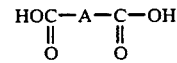

in the presence of a diaryl carbonate, such as diphenyl carbonate

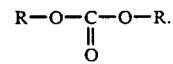

In this case, the copolyesteramides obtained will have COOR endgroups emanating from the monomers and/or oligomers containing a carboxylic acid functional group after reaction with the diaryl carbonate, namely, R is an aromatic monovalent radical, and OH and NH$_2$ endgroups emanating from the monomers containing a hydroxyl and amino functional group. According to this method of preparation, after ring opening, the lactam will give rise to the formation of polymers in which the end functional groups may be COOR and/or NH$_2$, with R being derived from the diaryl The overall reaction can be represented as:

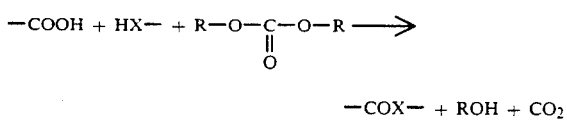

with X=O and NH and R representing an aromatic monovalent radical.

In a process of this type, the diaryl carbonate can react in a first stage will all of the monomers and oligomers containing, where appropriate, carboxylic acid functional groups:

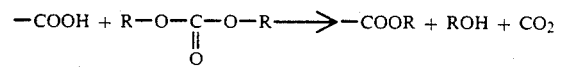

the esterification and amidation reaction taking place only in a second step:

Where appropriate, the diaryl carbonate may also be incorporated in the mixture of monomers and oligomers. Both of the reactions described above will then also take place in succession, without having to add the comonomers containing OH and NH$_2$ endgroups at the end of the stage of esterification of the monomers containing an acidic endgroup by the diaryl carbonate.

They can also be prepared by a polyesterification and polyamidation reaction between at least one aromatic or cycloaliphatic diacid HOOC—Ar$_1$—COOH, at least one diphenol diester

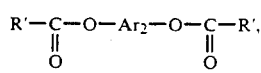

and at least one amino acid

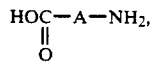

and/or at least one lactam

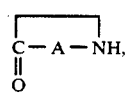

and/or at least one diacidic polyamide HOOC—A—COOH.

The diphenol diesters can be prepared by reaction with an alkanoic acid having from 2 to 6 carbon atoms, or by reaction with the chloride derived from this alkanoic acid, or else by reaction with an anhydride of alkane type, such as acetic anhydride. Under these conditions, R' is a monovalent radical of alkane type, having the backbone C$_n$H$_{2n-1}$, with n=2 to 6.

This modification of the phenolic functional groups can also be performed on the NH$_2$ ends of the amino acid which is present, where appropriate, in the initial mixture of monomers.

According to this process, the polycondensation reactions permit contacting, independently of each other: acidic functional groups and diphenol esters

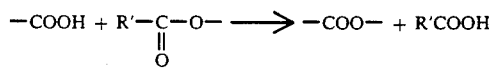

acidic functional groups and acylated amines

acidic functional groups and acylated amines

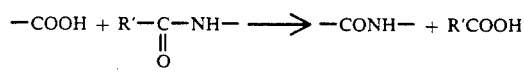

acidic functional groups and a lactam

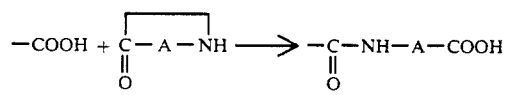

In sum, the subject process comprises reacting at least one aromatic or cycloaliphatic diacid HOOC—Ar$_1$—COOH with at least one diphenol diester

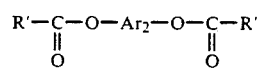

and at least one aliphatic amino acid H$_2$N—A—COOH, and/or at least one aliphatic lactam

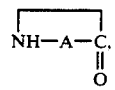

and/or at least one diacidic polyamide HOOC—A—COOH; or reacting at least one aromatic or cycloaliphatic diacid HOOC—Ar$_1$—COOH with at least one diphenol diester

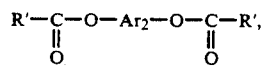

and at least one acylated amino acid

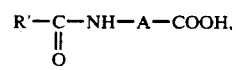

and/or at least one aliphatic lactam

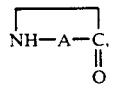

and/or at least one diacidic polyamide HOOC—A—COOH; or reacting at least one aromatic or cycloaliphatic diacid HOOC—Ar₁—COOH with at least one diphenol HO—Ar₂—OH and at least one aliphatic amino acid H₂N—A—COOH and/or at least one aliphatic lactam

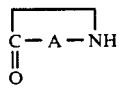

and/or at least one diacidic polyamide HOOC—A—COOH in the presence of an aliphatic compound which reacts with the phenolic and amine ends of the various monomers, to produce at least one diphenol diester

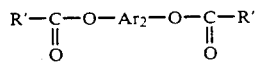

and at least one acylated amino acid

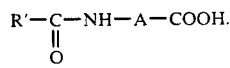

In consideration of the various monomers and the nature of their reactive groups, the copolyesteramides prepared according to this process have COOH endgroups derived from the monomers and/or from the diacidic oligomer and/or from the endgroups

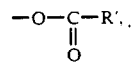

themselves derived from the diphenol diester, and/or —NH—Y, derived from the amino acid and/or from the lactam, Y being either a hydrogen atom or

being defined as the residue derived from the alkanoic acid, or from its chloride, or from an anhydride.

In the various polyesterification processes, the reaction can be carried out in known manner in the presence of catalysts. Exemplary such catalysts include dialkyltin oxides such as dibutyltin, diaryltin oxides, titanium dioxide, antimony trioxide, titanium or zirconium alcoholates, alkali metal and alkaline earth metal salts of carboxylic acids, such as zinc acetate or sodium acetate, gaseous acidic catalysts such as Lewis acids, in particular BF₃, or hydrogen halides, in particular HCl. The amount of catalyst which is employed is on the order of 0.001% to 2% by weight relative to the total charge of monomers and, preferably, on the order of 0.01% to 0.5% by weight.

In order to further illustrate the present invention and the advantages thereof, the following specific examples are given, it being understood that same are intended only as illustrative and in nowise limitative.

In said examples to follow, the melting point of each polycondensate was determined by differential thermal analysis.

The inherent viscosity of each polycondensate was measured in a 50/50 volume mixture of para-chlorophenol and meta-cresol at 45° C., with 0.1 g of polymer per 100 g of solvent. It is expressed in dl g⁻¹.

The anisotropy range was determined by examination of a sample of each polycondensate using a microscope fitted with a Linkamr TMS 90 heated stage between glass slides at a rate of temperature increase on the order of 5° to 20° C. per minute.

The tensile stress and modulus are expressed in MPa and the elongation at break in %, according to ISO standard R 527.

The flexural stress and modulus are expressed in MPa according to ISO standard 178.

EXAMPLE 1 (Comparative)

The following reactants were introduced into a 250-cm³ stirred glass polycondensation reactor fitted with a device allowing the reaction mixture to be purged with an inert gas, and equipped with a distillation column extended by a condenser and a graduated test tube for recovering the effluents formed during the reaction:

(a) terephthalic acid (T): 8.31 g (0.05 mol);
(b) 4,4'-dicarboxydiphenyl ether (4,4'-DCDPE): 45.21 g (0.175 mol);
(c) methylhydroquinone diacetate (MeHQ diAc): 46.85 g (0.225 mol).

Under these conditions, the molar ratio (c)/(a)+(b) was equal to 1; a represents 22.22 mol % of the mixture of diacids (a)+(b), which corresponds to a ratio (b)/(a)=7/2.

The reactor was purged with nitrogen and was then immersed under nitrogen purging in a metal bath controlled at 265° C. After a few minutes, the first droplet of acetic acid distilled over ($t_o$ of the reaction). After 40 minutes at this temperature, the amount of effluents collected, 15 ml, corresponded to 58.2% of the theoretical amount of acetic acid. The reaction was then continued for 70 minutes at 265° C. The temperature of the metal bath was then increased gradually over 10 minutes to 285° C., at which temperature the reaction was continued for 15 minutes. At the end of this plateau, 84.4% by weight of the theoretical acetic acid had been recovered, i.e., 22.8 g. The pressure inside the reactor was then gradually decreased from 1008×10² Pa to 27 Pa. At the same time, the temperature of the metal bath was increased to 330° C. over an interval of 70 minutes. During this period, the stirring rate was reduced in proportion with the increase in viscosity. After 200 minutes of reaction, 130 under inert atmosphere and 70 under reduced pressure, a total of 25.4 ml of acetic acid, i.e., 98.6% of the theoretical, had been recovered.

The polymer obtained was fibrous and whitish. It had an inherent viscosity of 1.01 dl g⁻¹. Its melting temperature was 309° C. This polymer was anisotropic ranging from its melting point to over 360° C.

After having been granulated, dried under vacuum for 6 hours at 80° C. and molded in a Mining MCP 25 SA press into the form of standardized test pieces, the tensile and flexural tests carried out on this polymer provided the following values:

| | |
|---|---|
| Tensile stress | 133 MPa |
| Tensile modulus | 4660 MPa |
| Elongation at break | 8.5% |
| Flexural stress | 143.5 MPa |
| Flexural modulus | 4150 MPa |

This copolyester included the following recurring units:

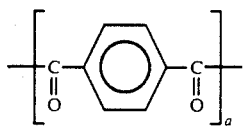

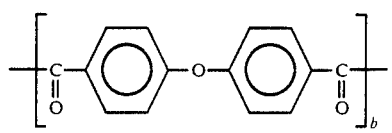

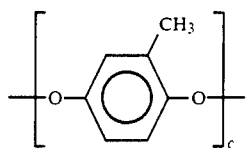

with a=0.111; b=0.389 and c=0.50.

EXAMPLES 2 TO 5 (Comparative)

These examples relate to the preparation of thermotropic copolyesters from:
(a) terephthalic acid (T);
(b) 4,4'-dicarboxydiphenyl ether (4,4'-DCDPE); and
(c) methylhydroquinone diacetate (MeHQ diAc).

The synthesis conditions were identical with those of Example 1. They are summarized in Table 1.

Table 2 reports the principal characteristics of these copolyesters, whose structures are detailed in Table 3.

EXAMPLES 6 TO 8 (Comparative)

These examples illustrate the synthesis and the characteristics of wholly aromatic copolyesteramides prepared from:
(a) terephthalic acid (T);
(b) 4,4'-dicarboxydiphenyl ether (4,4'-DCDPE);
(c) methylhydroquinone diacetate (MeHQ diAc); and
(d) para-acetamidobenzoic acid (PAB).

The synthesis conditions were identical with those of Example 1. They are summarized in Table 4. The principal characteristics of the copolyesteramides obtained, when the quality of the molded bars and test pieces made it possible to evaluate their properties, are reported in Table 5. These polymers correspond to the formulae shown in Table 6.

EXAMPLES 9 TO 17

These examples illustrate the synthesis and the characteristics of copolyesteramides prepared from aliphatic amino acids and/or lactams.

These copolyesteramides were prepared from:
(a) terephthalic acid (T);
(b) 4,4'-dicarboxydiphenyl ether (4,4'-DCDPE);
(c) isophthalic acid (I);
(d) methylhydroquinone diacetate (MeHQ diAc);
(e) hydroquinone diacetate (HQ diAc);
(f) 11-aminoundecanoic acid (A 11); and
(g) dodecalactam (L 12)

The synthesis conditions were identical with those of Example 1. They are summarized in Table 7. The principal characteristics of the polymers obtained are reported in Table 8. Their formulae are detailed in Table 9.

EXAMPLES 18 TO 20

These examples illustrate the synthesis and the characteristics of copolyesteramides prepared from a diacidic polyamide.

These copolyesteramides were prepared from:
(a) terephthalic acid (T);
(b) 4,4'-dicarboxydiphenyl ether (4,4'-DCDPE);
(c) methylhydroquinone diacetate (MeHQ diAc); and
(d) diacidic polyamide 12 (PA 12.T),
resulting from the polycondensation of dodecalactam in the presence of terephthalic acid, having an average molecular weight of 640.

The synthesis conditions were identical with those of Example 1. They are summarized in Table 10. The principal characteristics of these polymers are reported in Table 11. They correspond to the formulae detailed in Table 12.

TABLE 1

| | AMOUNT OF MONOMERS INTRODUCED INTO THE REACTOR | | | | | | INITIAL MOLAR RATIO | |
|---|---|---|---|---|---|---|---|---|
| | DIACIDS | | | | DIPHENOL DIACETATES | | | |
| EXAMPLE | T | | 4,4'-DCDPE | | MeHQ diAc | | | 4,4'-DCDPE + T |
| NUMBER | g | mol | g | mol | g | mol | 4,4'-DCDPE/T | MeHQ diAc |
| 2 | / | / | 58.1 | 0.225 | 46.85 | 0.225 | 1/0 | 1/1 |
| 3 | 7.47 | 0.045 | 46.48 | 0.18 | 46.85 | 0.225 | 4/1 | 1/1 |
| 4 | 16.61 | 0.1 | 32.28 | 0.125 | 46.85 | 0.225 | 5/4 | 1/1 |
| 5 | 24.92 | 0.15 | 19.37 | 0.075 | 46.85 | 0.225 | 1/2 | 1/1 |

| | REACTION TIME (MIN) | | | DEGREE OF CONVERSION (%) | |
|---|---|---|---|---|---|
| EXAMPLE NUMBER | UNDER NITROGEN STREAM | UNDER REDUCED PRESSURE | REACTION TEMPERATURE (temperature profile) | at the end of the stage under nitrogen | on completion of the reaction |
| 2 | 130 | 85 | 90 minutes at 280° C. 65 minutes from 280° to 340° C. 60 minutes at 340° C. | 81.4 | 96.4 |
| 3 | 135 | 95 | 75 minutes at 270° C. 15 minutes from 270° | 85.5 | 98.5 |

TABLE 1-continued

| | | | | | |
|---|---|---|---|---|---|
| 4 | 155 | 45 | to 290° C. 20 minutes at 290° C. 70 minutes from 290° to 330° C. 50 minutes at 330° C. 115 minutes at 285° C. 35 minutes from 285° to 315° C. 50 minutes at 315° C. | 90.3 | 98.7 |
| 5 | 195 | 25 | 60 minutes at 265° C. 10 minutes from 265° to 285° C. 45 minutes at 285° C. 40 minutes from 285° to 325° C. 55 minutes at 325° C. | 77.1 | 97.9 |

TABLE 2

| | | | | MOLDING CONDITIONS | |
|---|---|---|---|---|---|
| EXAMPLE NUMBER | MELTING POINT (°C.) | ANISOTROPY RANGE (°C.) | INHERENT VISCOSITY (dl/g) | INJECTION TEMPERATURE (°C.) | MOLD TEMPERATURE (°C.) |
| 2 | 345 | not observed | insoluble | 355 | 90 |
| 3 | 312 | from 315° to over 360° C. | 1.23 | 315 | 90 |
| 4 | 281 | from 285° to over 360° C. | insoluble | 295 | 90 |
| 5 | 311 | from 315° to over 360° C. | 1.79 | 290 | 100 |

| | TENSILE PROPERTIES | | | FLEXURAL PROPERTIES | |
|---|---|---|---|---|---|
| EXAMPLE NUMBER | STRESS (MPa) | ELONGATION AT BREAK (%) | MODULUS (MPa) | STRESS (MPa) | MODULUS (MPa) |
| 2 | not measurable | not measurable | not measurable | not measurable | not measurable |
| 3 | 129 | 8.2 | 4,510 | 142 | 3,950 |
| 4 | 140 | 4.25 | 6,740 | 143 | 4,965 |
| 5 | 139 | 2.2 | 9,045 | 133 | 6.454 |

TABLE 3

| EXAMPLE NUMBER | POLYMER STRUCTURE |
|---|---|

2

$$\left[\begin{array}{c}\underset{\|}{C}-\bigcirc-O-\bigcirc-\underset{\|}{C}\\O\end{array}\right]_b \left[\begin{array}{c}O-\bigcirc\text{-}CH_3-O\end{array}\right]_c$$

with b = 0.50 and c = 0.50

3

$$\left[\begin{array}{c}\underset{\|}{C}-\bigcirc-\underset{\|}{C}\\O\quad\quad O\end{array}\right]_a \left[\begin{array}{c}\underset{\|}{C}-\bigcirc-O-\bigcirc-\underset{\|}{C}\\O\quad\quad\quad\quad O\end{array}\right]_b \left[\begin{array}{c}O-\bigcirc\text{-}CH_3-O\end{array}\right]_c$$

with a = 0.10; b = 0.40 and c = 0.50

4

$$\left[\begin{array}{c}\underset{\|}{C}-\bigcirc-\underset{\|}{C}\\O\quad\quad O\end{array}\right]_a \left[\begin{array}{c}\underset{\|}{C}-\bigcirc-O-\bigcirc-\underset{\|}{C}\\O\quad\quad\quad\quad O\end{array}\right]_b \left[\begin{array}{c}O-\bigcirc\text{-}CH_3-O\end{array}\right]_c$$

with a = 0.222; b = 0.278 and c = 0.50

TABLE 3-continued

| EXAMPLE NUMBER | POLYMER STRUCTURE |
|---|---|
| 5 | 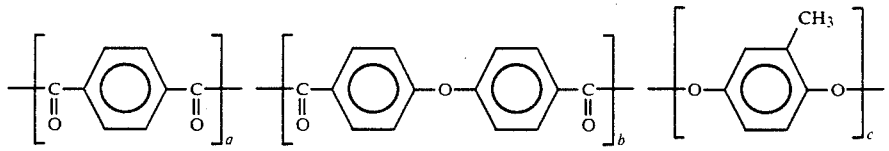 with a = 0.333; b = 0.167 and c = 0.50 |

TABLE 4

AMOUNT OF MONOMERS INTRODUCED INTO THE REACTOR

| EXAMPLE NUMBER | DIACIDS T g | DIACIDS T mol | DIACIDS 4,4'-DCDPE g | DIACIDS 4,4'-DCDPE mol | DIPHENOL DIACETATE MeHQ diAc g | DIPHENOL DIACETATE MeHQ diAc mol | AROMATIC ACETAMIDOACID PAB g | AROMATIC ACETAMIDOACID PAB mol | INITIAL MOLAR RATIO 4,4'-DCDPE/T | INITIAL MOLAR RATIO 4,4'-DCDPE + T / MeHQ diAc | INITIAL MOLAR RATIO PAB / MeHQ diAc |
|---|---|---|---|---|---|---|---|---|---|---|---|
| 6 | / | / | 64.56 | 0.25 | 52.05 | 0.25 | 4.48 | 0.025 | 1/0 | 1/1 | 1/10 |
| 7 | / | / | 64.56 | 0.25 | 52.05 | 0.25 | 8.96 | 0.05 | 1/0 | 1/1 | 1/5 |
| 8 | 8.31 | 0.05 | 51.65 | 0.2 | 52.05 | 0.25 | 4.48 | 0.025 | 4/1 | 1/1 | 1/10 |

| EXAMPLE NUMBER | REACTION TIME (MIN) UNDER NITROGEN STREAM | REACTION TIME (MIN) UNDER REDUCED PRESSURE | REACTION TEMPERATURE (temperature profile) | DEGREE OF CONVERSION (%) at the end of the stage under nitrogen | DEGREE OF CONVERSION (%) on completion of the reaction |
|---|---|---|---|---|---|
| 6 | 105 | 35 | 35 minutes from 240° to 270° C. 40 minutes at 270° C. 40 minutes from 270° to 330° C. 35 minutes at 330° C. | 84.3 | 94.9 |
| 7 | 100 | 30 | 35 minutes from 240° to 280° C. 30 minutes at 280° C. 35 minutes from 280° to 330° C. 30 minutes at 330° C. | 83 | 96.9 |
| 8 | 105 | 40 | 30 minutes from 240° to 270° C. 20 minutes at 270° C. 55 minutes from 270° to 330° C. 40 minutes at 330° C | 85.9 | 96.6 |

TABLE 5

| EXAMPLE NUMBER | MELTING POINT (°C.) | ANISOTROPY RANGE (°C.) | INHERENT VISCOSITY (dl/g) | MOLDING CONDITIONS INJECTION TEMPERATURE (°C.) | MOLDING CONDITIONS MOLD TEMPERATURE (°C.) |
|---|---|---|---|---|---|
| 6 | 340 | not observed | insoluble | 350 | 100 |
| 7 | >360 | not observed | insoluble | 360 | 100 |
| 8 | 335 | not observed | insoluble | 340 | 100 |

| EXAMPLE NUMBER | TENSILE PROPERTIES STRESS (MPa) | TENSILE PROPERTIES ELONGATION AT BREAK (%) | TENSILE PROPERTIES MODULUS (MPa) | FLEXURAL PROPERTIES STRESS (MPa) | FLEXURAL PROPERTIES MODULUS (MPa) |
|---|---|---|---|---|---|
| 6 | not measurable | not measurable | not measurable | not measurable | not measurable |
| 7 | not measurable | not measurable | not measurable | not measurable | not measurable |
| 8 | 9 | 0.9 | / | 32 | 3025 |

TABLE 6

| EXAMPLE NUMBER | POLYMER STRUCTURE |
|---|---|
| 6 | 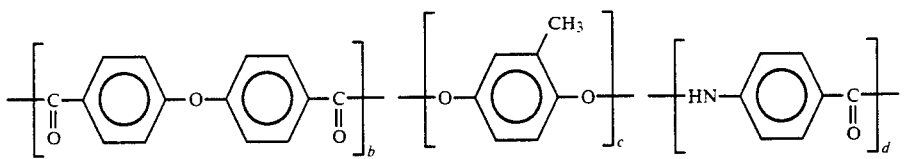 with b = 0.476; c = 0.476 and d = 0.048 |
| 7 | 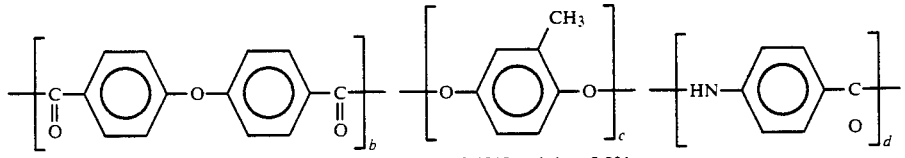 with b = 0.4545; c = 0.4545 and d = 0.091 |
| 8 | 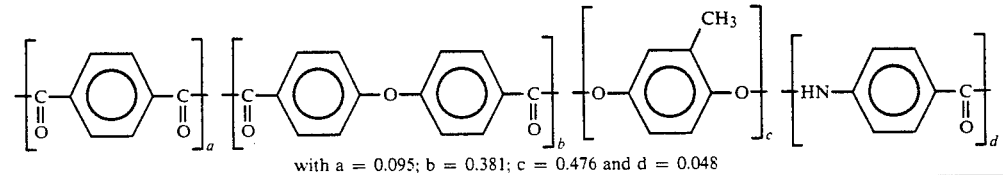 with a = 0.095; b = 0.381; c = 0.476 and d = 0.048 |

TABLE 7

| EXAMPLE NUMBER | AMOUNT OF MONOMERS INTRODUCED INTO THE REACTOR | | | | | | | | | | | INITIAL MOLAR RATIO $\frac{4,4'\text{-DCDPE}}{T+I}$ |
|---|---|---|---|---|---|---|---|---|---|---|---|---|
| | DIACIDS | | | | | | DIPHENOL DIACETATES | | | | LACTAM OR AMINO ACID | |
| | T | | 4,4'-DCDPE | | I | | MeHQ diAc | | HQ diAc | | A11 | L12 | |
| | g | mol | g | mol | g | mol | g | mol | g | mol | g | mol | g | mol | |

| EX- AMPLE NUM- BER | T g | T mol | 4,4'-DCDPE g | 4,4'-DCDPE mol | I g | I mol | MeHQ diAc g | MeHQ diAc mol | HQ diAc g | HQ diAc mol | A11 g | A11 mol | L12 g | L12 mol | $\frac{4,4'\text{-DCDPE}}{T+I}$ |
|---|---|---|---|---|---|---|---|---|---|---|---|---|---|---|---|
| 9 | / | / | 64.56 | 0.25 | / | / | 52.05 | 0.25 | / | / | / | / | 4.94 | 0.025 | 1/0 |
| 10 | / | / | 64.56 | 0.25 | / | / | 52.05 | 0.25 | / | / | / | / | 9.87 | 0.05 | 1/0 |
| 11 | 8.31 | 0.05 | 51.65 | 0.2 | / | / | 52.05 | 0.25 | / | / | / | / | 4.94 | 0.025 | 4/1 |
| 12 | 8.31 | 0.05 | 45.21 | 0.175 | / | / | 46.85 | 0.225 | / | / | 4.53 | 0.0225 | / | / | 7/2 |
| 13 | 16.61 | 0.1 | 32.28 | 0.125 | / | / | 46.85 | 0.225 | / | / | 4.53 | 0.0225 | / | / | 5/4 |
| 14 | 16.61 | 0.1 | 12.91 | 0.05 | 12.46 | 0.075 | 46.85 | 0.225 | / | / | 4.53 | 0.225 | / | / | 2/7 |
| 15 | 24.92 | 0.15 | 19.37 | 0.075 | / | / | 46.85 | 0.225 | / | / | / | / | 4.44 | 0.0225 | 1/2 |
| 16 | 24.92 | 0.15 | 19.37 | 0.075 | / | / | 37.48 | 0.18 | 8.74 | 0.045 | / | / | 4.44 | 0.0225 | 1/2 |
| 17 | 24.92 | 0.15 | 19.37 | 0.075 | / | / | 37.48 | 0.18 | 8.74 | 0.045 | / | / | 8.88 | 0.045 | 1/2 |

| EXAMPLE NUMBER | INITIAL MOLAR RATIO $\frac{4,4'\text{-DCDPE} + T + I}{\text{MeHQ} + \text{HQ diAc}}$ | INITIAL MOLAR RATIO $\frac{A11 + L12}{\text{MeHQ} + \text{HQ diAc}}$ | REACTION TIME (MIN) UNDER NITROGEN STREAM | REACTION TIME (MIN) UNDER REDUCED PRESSURE | REACTION TEMPERATURE (temperature profile) | DEGREE OF CONVERSION (%) at the end of the stage under nitrogen | DEGREE OF CONVERSION (%) on completion of the reaction |
|---|---|---|---|---|---|---|---|
| 9 | 1/1 | 1/10 | 160 | 40 | 20 minutes from 230° to 270° C. 20 minutes at 270° C. 75 minutes from 270° to 330° C. 85 minutes at 330° C. | 85.4 | 96.6 |
| 10 | 1/1 | 1/5 | 115 | 25 | 40 minutes from 240° to 280° C. 25 minutes at 280° C. 50 minutes from 280° to 330° C. 25 minutes at 330° C. | 82.8 | 96.8 |
| 11 | 1/1 | 1/10 | 160 | 25 | 15 minutes from 240° to 260° C. 25 minutes at 260° C. 100 minutes from 270° to 330° C. 45 minutes at 330° C. | 83.5 | 97.2 |
| 12 | 1/1 | 1/10 | 120 | 140 | 70 minutes at 265° C. 10 minutes from 265° to 280° C. 40 minutes to 280° C. 70 minutes from 280° to 320° C. 70 minutes at 320° C. | 81.6 | 98.8 |

TABLE 7-continued

| | | | | | | | |
|---|---|---|---|---|---|---|---|
| 13 | 1/1 | 1/10 | 100 | 140 | 50 minutes at 265° C. 10 minutes from 265° to 280° C. 40 minutes at 280° C. 55 minutes from 280° to 320° C. 85 minutes from 320° to 340° C. | 80.7 | 99.5 |
| 14 | 1/1 | 1/10 | 100 | 115 | 70 minutes at 265° C. 10 minutes from 265° to 275° C. 70 minutes at 275° C. 50 minutes from 275° to 320° C. 15 minutes at 320° C. | 65.8 | 97.8 |
| 15 | 1/1 | 1/10 | 105 | 120 | 70 minutes at 265° C. 45 minutes from 265° to 305° C. 50 minutes at 305° C. 10 minutes from 305° to 320° C. 50 minutes at 320° C. | 69.6 | 99.1 |
| 16 | 1/1 | 1/10 | 110 | 130 | 60 minutes at 270° C. 10 minutes from 270° to 280° C. 80 minutes at 280° C. 35 minutes from 280° to 340° C. 55 minutes at 340° C. | 75.2 | 98.9 |
| 17 | 1/1 | 1/5 | 105 | 165 | 80 minutes at 270° C. 10 minutes from 270° to 285° C. 80 minutes at 285° C. 20 minutes from 285° to 320° C. 80 minutes at 320° C. | 67.6 | 97.3 |

TABLE 8

| | | | | MOLDING CONDITIONS | |
|---|---|---|---|---|---|
| EXAMPLE NUMBER | MELTING POINT (°C.) | ANISOTROPY RANGE (°C.) | INHERENT VISCOSITY (dl/g) | INJECTION TEMPERATURE (°C.) | MOLD TEMPERATURE (°C.) |
| 9 | 320 | from 325° to 340° C. | insoluble | 330 | 90 |
| 10 | 310 | from 315° to 330° C. | insoluble | 320 | 90 |
| 11 | 285 | from 290° to over 360° C. | 0.87 | 300 | 100 |
| 12 | 287 | from 290° to over 360° C. | 1.1 | 300 | 90 |
| 13 | 262 | from 265° to over 360° C. | 1.02 | 280 | 90 |
| 14 | 245 | from 250° to over 360° C. | 1.38 | 275 | 90 |
| 15 | 304 | from 310° to over 360° C. | insoluble | 310 | 90 |
| 16 | 312 | from 315° to over 360° C. | 1.24 | 315 | 90 |
| 17 | 288 | from 290° to over 360° C. | 1.7 | 295 | 90 |

| | TENSILE PROPERTIES | | | FLEXURAL PROPERTIES | |
|---|---|---|---|---|---|
| EXAMPLE NUMBER | STRESS (MPa) | ELONGATION AT BREAK (%) | MODULUS (MPa) | STRESS (MPa) | MODULUS (MPa) |
| 9 | 64 | 5.3 | 3,620 | 54 | 2,940 |
| 10 | 58 | 6.2 | 3,460 | 62 | 2,945 |
| 11 | 97 | 5.2 | 4,215 | 101 | 3,690 |
| 12 | 117 | 7.7 | 4,990 | 129 | 4,140 |
| 13 | 147 | 4.85 | 7,270 | 133 | 4,455 |
| 14 | 158 | 4.25 | 8,185 | 145 | 5,340 |
| 15 | 140 | 3.05 | 9,500 | 111 | 5,045 |
| 16 | 140 | 2.2 | 11,000 | 137 | 6,265 |
| 17 | 109 | 2.4 | 7,355 | 142 | 6,020 |

TABLE 9

| EXAMPLE NUMBER | POLYMER STRUCTURE |
|---|---|
| 9 | with b = 0.476; c = 0.476 and d = 0.048 |
| 10 | with b = 0.4545; c = 0.4545 and d = 0.091 |
| 11 | with a = 0.095; b = 0.381; c = 0.476 and d = 0.048 |
| 12 | with a = 0.106; b = 0.37; c = 0.476 and d = 0.048 |
| 13 | with a = 0.212; b = 0.264; c = 0.476 and d = 0.048 |
| 14 | with a = 0.212; g = 0.158; b = 0.106; c = 0.476 and i = 0.048 |
| 15 | with a = 0.318; b = 0.158; c = 0.476 and e = 0.048 |
| 16 | with a = 0.318; b = 0.158; c = 0.381; h = 0.095 and e = 0.048 |
| 17 | |

TABLE 9-continued

| EXAMPLE NUMBER | POLYMER STRUCTURE |
|---|---|
| | with a = 0.303; b = 0.151; c = 0.364; h = 0.091 and e = 0.091 |

TABLE 10

AMOUNT OF MONOMERS INTRODUCED INTO THE REACTOR

| EXAMPLE NUMBER | DIACIDS T | | 4,4'-DCDPE | | DIPHENOL DIACETATE MeHQ diAc | | DIACIDIC POLYAMIDE OGLIGOMER PA 12.T (Mn 640) | |
|---|---|---|---|---|---|---|---|---|
| | g | mol | g | mol | g | mol | g | mol |
| 18 | 6.65 | 0.04 | 36.15 | 0.14 | 41.64 | 0.2 | 12.8 | 0.02 |
| 19 | 13.29 | 0.08 | 25.82 | 0.1 | 41.64 | 0.2 | 12.8 | 0.02 |
| 20 | 19.94 | 0.12 | 15.5 | 0.06 | 41.64 | 0.2 | 12.8 | 0.02 |

| EXAMPLE NUMBER | INITIAL MOLAR RATIO | | | REACTION TIME (MIN) | |
|---|---|---|---|---|---|
| | 4,4'-DCDPE/T | 4,4'-DCDPE + T / MeHQ diAc | PA 12.T / MeHQ diAc | UNDER NITROGEN STREAM | UNDER REDUCED PRESSURE |
| 18 | 7/2 | 1/1 | 1/10 | 80 | 50 |
| 19 | 5/4 | 1/1 | 1/10 | 75 | 85 |
| 20 | 1/2 | 1/1 | 1/10 | 110 | 45 |

| EXAMPLE NUMBER | REACTION TEMPERATURE (temperature profile) | DEGREE OF CONVERSION (%) | |
|---|---|---|---|
| | | at the end of the stage under nitrogen | on completion of the reaction |
| 18 | 60 minutes at 280° C. 20 minutes from 280° to 300° C. 30 minutes at 300° C. 20 minutes from 300° to 330° C. | 87.5 | 98.9 |
| 19 | 120 minutes at 290° C. 40 minutes from 290° to 340° C. | 90.3 | 99.6 |
| 20 | 50 minutes at 265° C. 10 minutes from 265° to 290° C. 50 minutes at 290° C. 45 minutes from 290° to 325° C. | 92.4 | 98.7 |

TABLE 11

| EXAMPLE NUMBER | MELTING POINT (°C.) | ANISOTROPY RANGE (°C.) | INHERENT VISCOSITY (dl/g) | MOLDING CONDITIONS | |
|---|---|---|---|---|---|
| | | | | INJECTION TEMPERATURE (°C.) | MOLD TEMPERATURE (°C.) |
| 18 | 260 | from 265° to over 360° C. | 1.07 | 290 | 90 |
| 19 | 260 | from 265° to over 360° C. | insoluble | 295 | 90 |
| 20 | 288 | from 290° to over 360° C. | 0.92 | 310 | 90 |

| EXAMPLE NUMBER | TENSILE PROPERTIES | | | FLEXURAL PROPERTIES | |
|---|---|---|---|---|---|
| | STRESS (MPa) | ELONGATION AT BREAK (%) | MODULUS (MPa) | STRESS (MPa) | MODULUS (MPa) |
| 18 | 125 | 6.8 | 5,625 | 110 | 3,935 |
| 19 | 114 | 3.2 | 6,835 | 85.5 | 3,610 |
| 20 | 118 | 3.3 | 6,950 | 135 | 5,740 |

TABLE 12
| EXAMPLE NUMBER | POLYMER STRUCTURE |
|---|---|
| 18 | 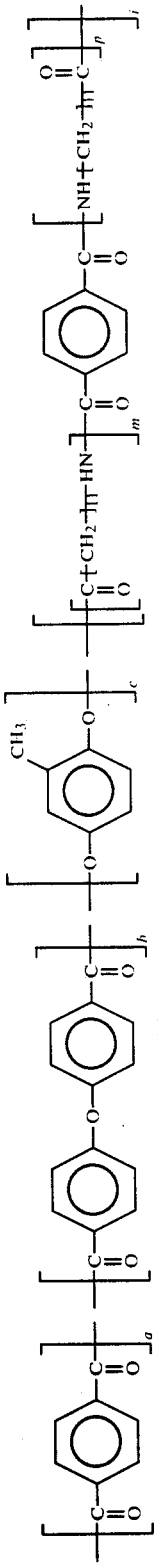 with a = 0.10; b = 0.35; c = 0.50 and i = 0.05 with m + p = 2.40 |
| 19 | 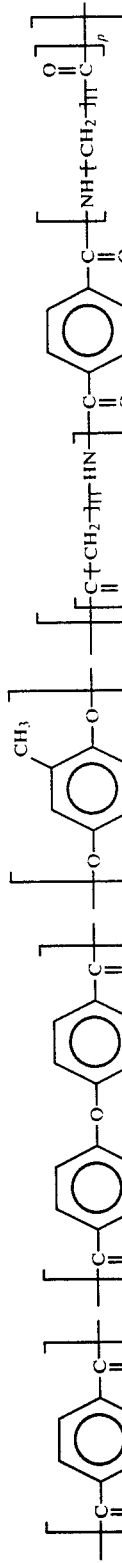 with a = 0.20; b = 0.25; c = 0.50 and i = 0.05 with m + p = 2.4 |
| 20 | 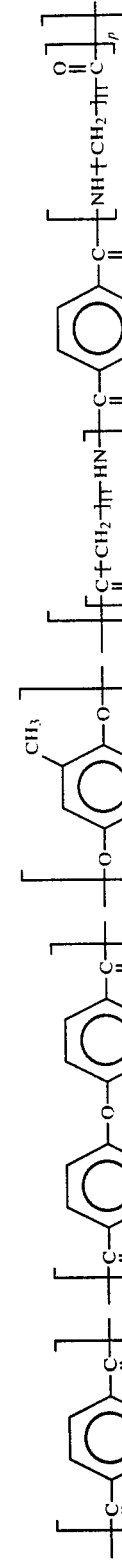 with a = 0.30; b = 0.15; c = 0.50 and i = 0.05 with m + p = 2.4 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermotropic semialiphatic copolyesteramide comprising the following recurring structural units:

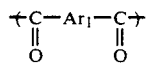 (I)

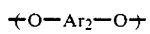 (II)

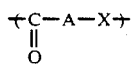 (III)

in which $Ar_1$ is selected from the group consisting of an aromatic and a cycloaliphatic divalent radical, $Ar_2$ is an aromatic divalent radical and X is —NH— or

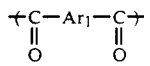 (I)

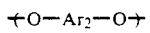 (II)

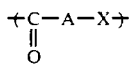 (III)

with the proviso that, when X is —NH—, A is a linear or branched chain $C_nH_{2n}$ divalent aliphatic hydrocarbyl radical and n is a number ranging from 4 to 14, and, when X is

the recurring unit

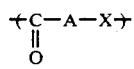

comprises an alpha, omega-diacidic polyamide oligomer of the formula:

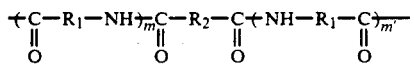

in which $R_1$ is a linear or branched chain $C_{n'}H_{2n'}$ divalent aliphatic hydrocarbyl radical and n' is a number ranging from 4 to 14; or a radical of the formula:

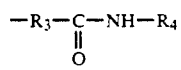

wherein $R_3$ and $R_4$, which are identical or different, are each a linear or branched chain $C_{n''}H_{2n''}$ divalent aliphatic hydrocarbyl radical and n'' ranges from 2 to 24; $R_2$ is a divalent aliphatic, cycloaliphatic or aromatic diacid radical; and m and m', which are identical or different, are numbers ranging from 0 to 50, at least m or $m^1$ being at least equal to 1.

2. The semialiphatic copolyesteramide as defined by claim 1, said recurring units (I) comprising the diacyl residue of an aromatic or cycloaliphatic dicarboxylic acid or derivative thereof.

3. The semialiphatic copolyesteramide as defined by claim 2, said recurring units (II) comprising the diether residue of a diphenol derivative thereof.

4. The semialiphatic copolyesteramide as defined by claim 3, said recurring units (III) derived from a diacidic polyamide oligomer and/or of an aliphatic amino acid and/or of a lactam.

5. The semialiphatic copolyesteramide as defined by claim 1, wherein said recurring units (III), X is —NH—.

6. The semialiphatic copolyesteramide as defined by claim 1, wherein said recurring units (III), X is

7. The semialiphatic copolyesteramide as defined by claim 1, wherein the ratio by weight of the recurring units (III) to the sum of the recurring units (I)+(II)+(III) ranges from 1% to 50%.

8. The semialiphatic copolyesteramide as defined by claim 7, said ratio ranging from 1% to 30%.

9. The semialiphatic copolyesteramide as defined by claim 5, wherein the molar ratio of the recurring units (II)/(I) ranges from 0.95 to 1.05.

10. The semialiphatic copolyesteramide as defined by claim 6, wherein the molar ratio of the recurring units (I)+(III)/(II) ranges from 0.95 to 1.05.

11. The semialiphatic copolyesteramide as defined by claim 1, wherein said recurring units (I), $Ar_1$ comprises a divalent benzene, diphenyl sulfide, diphenyl ether, biphenyl, terphenyl, naphthalene, diphenoxyalkane, stilbene or cyclohexane radical.

12. The semialiphatic copolyesteramide as defined by claim 11, wherein said recurring units (II), $Ar_2$ comprises a divalent benzene, halobenzene, alkylbenzene, phenylbenzene, biphenyl, diphenyl ether, diphenyl sulfide, stilbene or naphthalene radical.

13. A shaped article comprising the semialiphatic copolyesteramide as defined by claim 1.

* * * * *